(12) United States Patent
Srikanteswara et al.

(10) Patent No.: US 8,972,311 B2
(45) Date of Patent: Mar. 3, 2015

(54) INTELLIGENT SPECTRUM ALLOCATION BASED ON USER BEHAVIOR PATTERNS

(75) Inventors: Srikathyayani Srikanteswara, Portland, OR (US); Carlos Cordeiro, Portland, OR (US); Bahareh Sadeghi, Portland, OR (US); Reza Arefi, Great Falls, VA (US); Geoff O. Weaver, Portland, OR (US); Takashi Shono, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 13/533,318

(22) Filed: Jun. 26, 2012

(65) Prior Publication Data

US 2013/0275346 A1    Oct. 17, 2013

Related U.S. Application Data

(60) Provisional application No. 61/603,261, filed on Apr. 11, 2012.

(51) Int. Cl.
*G06F 15/18* (2006.01)
*H04L 12/24* (2006.01)
(52) U.S. Cl.
CPC .................. *H04L 41/0896* (2013.01)
USPC ........................................................... 706/12

(58) Field of Classification Search
CPC .............. H04L 65/80; H04L 29/06326; H04L 41/0896
USPC ....................................................... 706/12, 45
See application file for complete search history.

(56) References Cited

U.S. PATENT DOCUMENTS

| | | | |
|---|---|---|---|
| 2006/0143111 A1* | 6/2006 | Mylet ............................... | 705/37 |
| 2008/0222019 A1* | 9/2008 | Stanforth et al. ............... | 705/37 |
| 2011/0246411 A1* | 10/2011 | Laneman et al. ............... | 706/52 |
| 2012/0136936 A1* | 5/2012 | Quintuna ....................... | 709/204 |
| 2013/0005374 A1* | 1/2013 | Uusitalo et al. ............... | 455/509 |
| 2013/0185433 A1* | 7/2013 | Zhu et al. ....................... | 709/226 |
| 2013/0191312 A1* | 7/2013 | Barrett et al. .................. | 706/45 |

* cited by examiner

*Primary Examiner* — David Vincent

(57) ABSTRACT

A platform to facilitate transferring spectrum rights is provided that includes a database to ascertain information regarding available spectrum for use in wireless communications. A request for spectrum use from an entity needing spectrum may be matched with available spectrum. This matching comprises determining a pattern in user requests overtime to optimize spectrum allocation. The Cloud Spectrum Services (CSS) process allows entities to access spectrum they would otherwise not have; it allows the end user to complete their download during congested periods while maintaining high service quality; and it allows the holder of rental spectrum to receive compensation for an otherwise idle asset.

14 Claims, 6 Drawing Sheets

INTELLIGENT SPECTRUM ALLOCATION BASED ON USER BEHAVIOR PATTERNS

This application claims priority to U.S. Provisional Application No. 61/603,261 entitled "INTELLIGENT SPECTRUM ALLOCATION BASED ON USER BEHAVIOR PATTERNS FOR EFFICIENT SPECTRUM USAGE," filed Apr. 11, 2012, the entire disclosure of which is incorporated herein by reference in its entirety.

BACKGROUND

1. Field of the Disclosed Embodiments

The present invention relates generally to wireless communications and more particularly to a cloud spectrum management service that can provide spectrum proactively based on the behavior pattern of users or devices.

2. Introduction

Service providers and device manufacturers (e.g., wireless, cellular, etc.) are continually challenged to deliver value and convenience to consumers by, for example, providing compelling network services. Numerous organizations have forecast significant mobile broadband traffic growth over the coming 5-10 years worldwide. On average, those forecasts approach 80% compound annual growth rate. This high traffic growth leads to the conclusion that spectrum (current and planned) targeted for exclusive licensing by mobile broadband carriers could be exhausted before the end of the decade. On the other hand, in spite of the potential spectrum scarcity problem, spectrum utilization measurements in most countries, worldwide, have shown that there is a large amount of underutilized spectrum in the 300 MHz to 6 GHz range. Industry and regulatory agencies are aware of these facts and issues, and are thereby trying to adopt more flexible and dynamic regulatory framework to enable spectrum sharing or access, which is called Dynamic Spectrum Sharing (DSS) and Dynamic Spectrum Access (DSA), respectively. DSS and DSA may enable a secondary user or spectrum holder in need of spectrum availability to use spectrum assigned to, or owned by, a primary user or spectrum holder without any harmful interference.

Cloud Spectrum Services (CSS) is a framework for Dynamic Spectrum Sharing (DSS) and Dynamic Spectrum Access (DSA) using the cloud for spectrum management that provides optimum spectrum allocation through dynamic spectrum rentals. At the heart of the CSS framework there is a CSS database and a broker that manages and optimizes the allocation based on various inputs like device capability, base station capability, spectrum availability and user needs, user movement and the like.

SOME EXAMPLE EMBODIMENTS

Therefore, there is a need for an approach for managing dynamic sharing of available spectrum services. In these embodiments there is proposed a scheme where a computing device such as a Cloud Spectrum Broker learns patterns in user requests over time and uses that to optimize spectrum allocation. Intelligent learning of user behavior and predictive models with Dynamic Spectrum Sharing (DSS) or Dynamic Spectrum Access (DSA) leads to better spectrum allocations and higher utilization.

According to one embodiment, a dynamic cloud based spectrum management platform, comprising a database operable to store information associated with at least one spectrum asset, wherein the stored information includes dynamic spectrum availability from spectrum holders advertising their spectrum for rent, wherein the database is further operable to apportion the spectrum for rent in response to knowledge information about a user request and a past behavior pattern of the user.

According to another embodiment, non-transitory machine-accessible medium that provides instructions, which when accessed, cause a machine to perform operations comprising maintaining a database operable to store information associated with at least one spectrum asset, wherein the stored information includes dynamic spectrum availability from spectrum holders advertising their spectrum for rent; apportioning the spectrum for rent in response to knowledge information about a user request and a past behavior pattern of the user.

According to another embodiment, apparatus comprising, at least one processor; and at least one memory including computer program code for one or more programs, the at least one memory and the computer program code configured to, with the at least one processor, cause the apparatus to perform at least the following, cause, at least in part, information corresponding to one or more available spectrum services provided by one or more spectrum service holders to be stored in a cloud spectrum service database, the information comprising one or more spectrum sharing criteria respectively associated with the one or more available spectrum services, the one or more spectrum sharing criteria being provided by the one or more spectrum service holders; process a request from a user for spectrum sharing to cause, at least in part, a determination to share one or more of the one or more available spectrum services with a source of the request for spectrum sharing based, at least in part, on a matching of the one or more spectrum sharing criteria stored in the cloud spectrum service database and one or more service criteria associated with the source of the request for spectrum sharing; and cause, at least in part, one or more of the one or more available spectrum services to be allocated to the source of the request for spectrum sharing based, at least in part, on knowledge information about a user request and a past behavior pattern of the user.

Exemplary embodiments are described herein. It is envisioned, however, that any system that incorporates features of any apparatus, method and/or system described herein are encompassed by the scope and spirit of the exemplary embodiments.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 3:
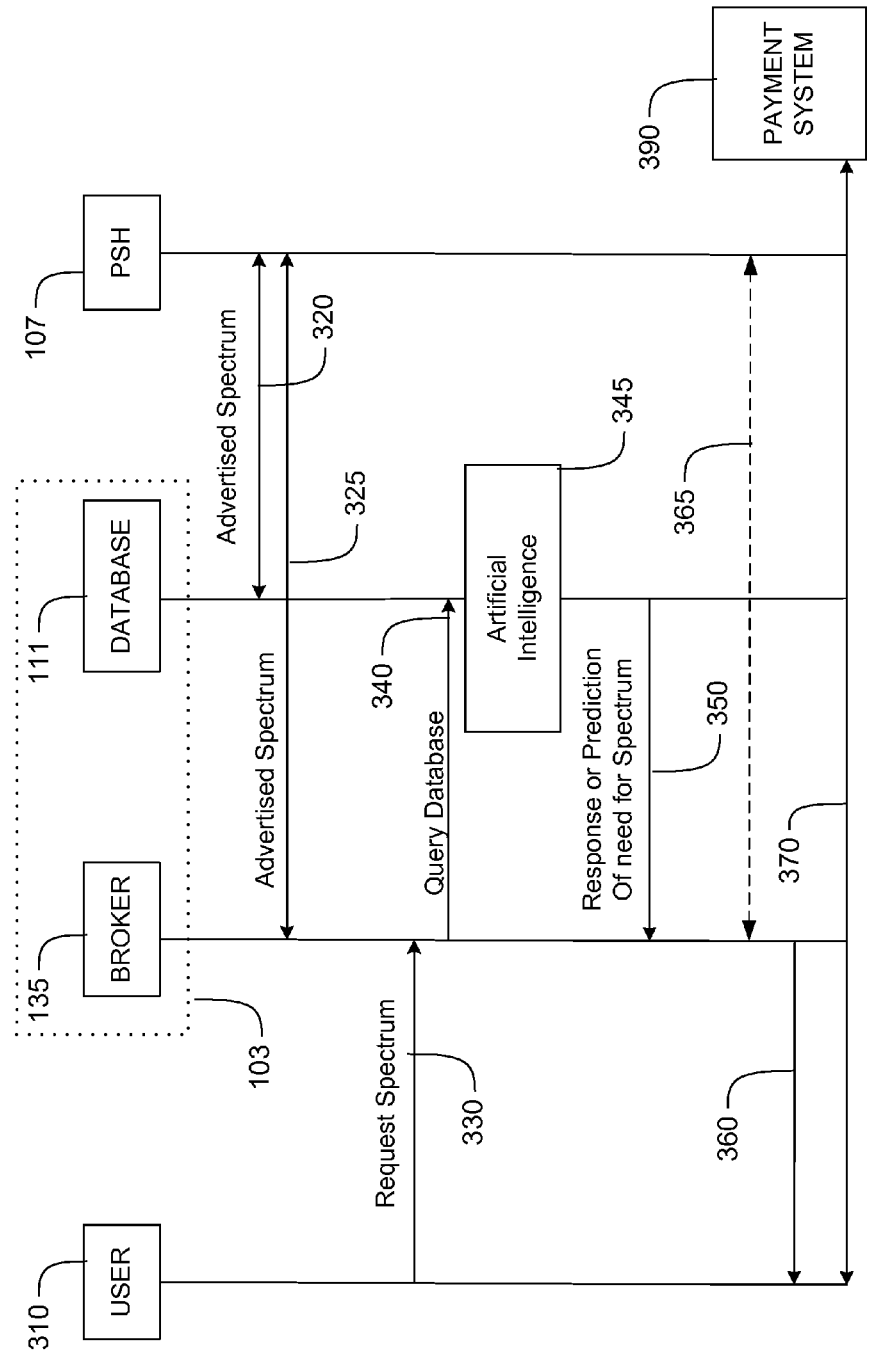
Figure 4:
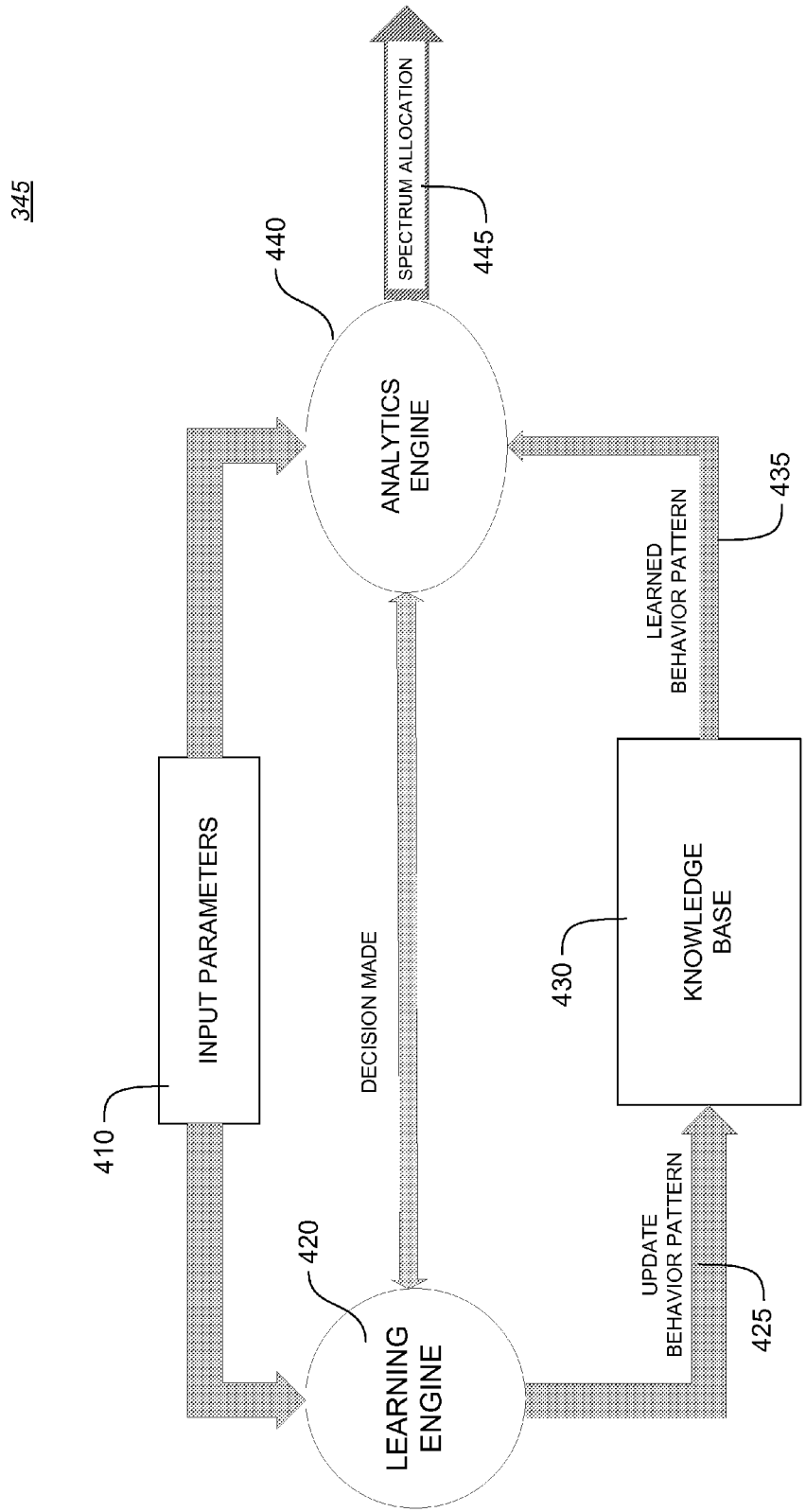
Figure 5:
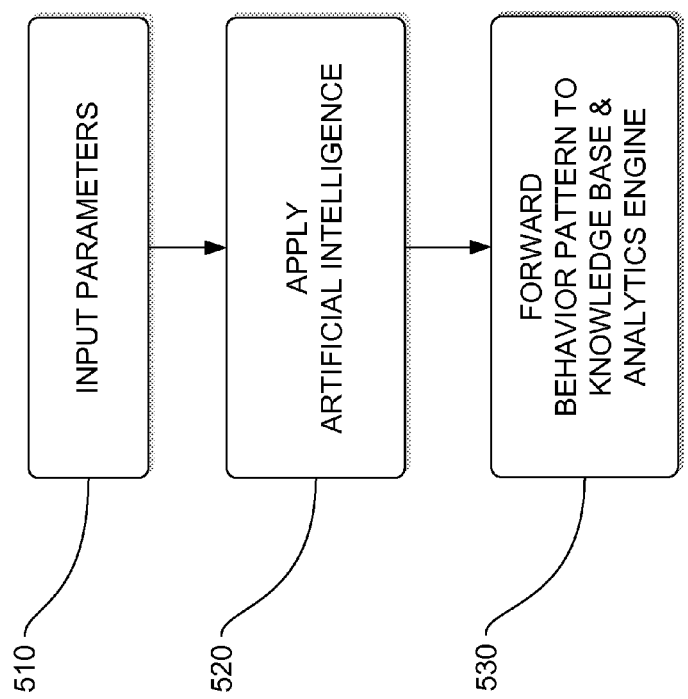
Figure 6:
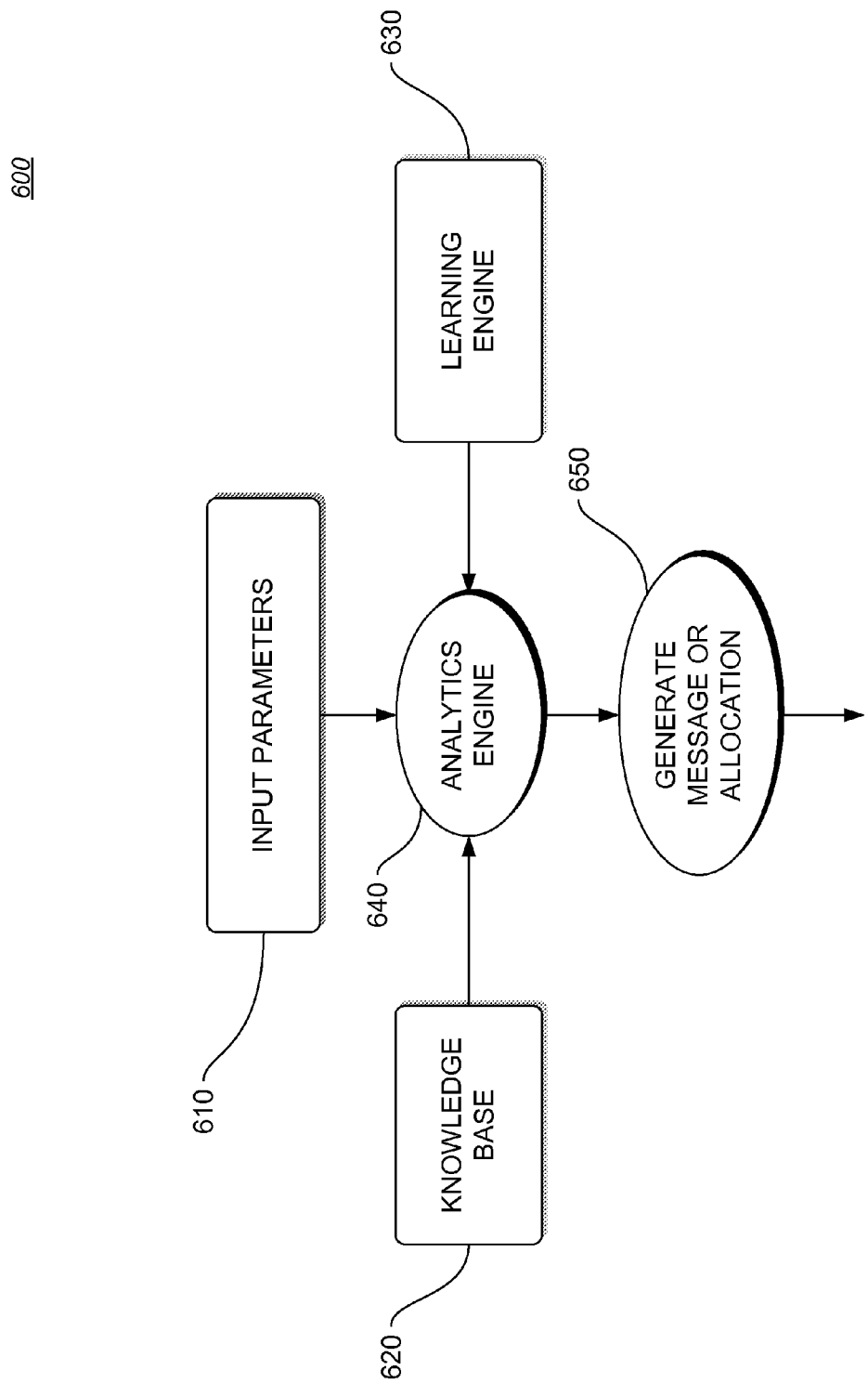

FIG. 3 provides an overview of the concept behind Cloud Spectrum Services (CSS) with behavior pattern prediction for dynamic spectrum rentals in accordance to an embodiment;

FIG. 4 is a block diagram of an apparatus to predict requests for spectrum and user behavior pattern in accordance to an embodiment;

FIG. 5 is a flowchart of a method to generate user behavior patterns that are stored in the knowledge base and used by an analytic engine to optimize spectrum allocation in accordance to an embodiment; and FIG. 6 is a flowchart of a method to implement predictive behavior determined in FIG. 5 to accomplish better spectrum allocation and higher utilization in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "spectrum asset" is a right to use, usually in a specific geographic area, a range of electromagnetic radiation, from the highest frequency to the lowest. The spectrum encompasses everything from X-rays and gamma rays to visible light and radio waves. Additionally, the spectrum asset can be reduced to a set of time slots selected from a group consisting of hours, days, time blocks, minutes, and seconds or to a frequency range that is also reducible to a set of time slots.

The term "Cloud Spectrum Services (CSS)" is used herein to refer to a dynamic spectrum rental scheme that uses a cloud-based database and optimization engine to allocate available spectrum to client devices.

The term "Multi-mode device (MMD)" is used herein to primarily refer to a user equipment (UE) such as a wireless device to transmit and/or receive data to/from a fixed network infrastructure, and includes for example a mobile device, tablet, computing device, TV sets, hand held (HH) device. An MMD could also be capable of directly using spectrum resources assigned by a Cloud Spectrum Broker CSB. An MMD can engage in wired or wireless communication with other devices.

As used herein the terms "lease" and "rent" are synonymous.

The term "Primary Spectrum Holder (PSH)" in the context of a cloud spectrum services (CSS) transaction, is a spectrum owner with rights conveyed by a regulatory authority to a portion of the radio spectrum that will be dynamically managed by a CSB and reallocated for temporary use to MMDs and/or Alternate Spectrum Holders (ASHs). Examples include TV broadcasters, cellular operators, and government agencies (military, organizations, public safety, and the like).

The term "Alternate Spectrum Holder (ASH)" as used herein is any entity which provides MMDs with access to a fixed network infrastructure. Examples include cellular operators and government agencies. In Cloud Spectrum Services (CSS) an ASH is a user that can request spectrum from a cloud spectrum broker.

The term "Cloud Spectrum Service Database (CSSD)" is used herein to refer to a device to Store data that are used by a CSB to dynamically manage the spectrum asset such as a radio spectrum resource, i.e., spectrum availability at a given time in a given location. The CSD can be deployed by a third party or as part of an ASH or PSH network.

The term "Content Provider (CP)" is used herein to refer to Content providers such as ESPN, Netflix, Hulu, Disney and Amazon. A CP may establish service agreements directly with MMDs and uses the services of a CSB to ensure reliable delivery of content to MMDs across any communication infrastructure such as wireless media. In Cloud Spectrum Services (CSS) a CP is a user that can request spectrum from a cloud spectrum broker.

The term "Cloud Spectrum Broker (CSB)" refers to the entity, such as a CSS management platform, responsible for managing CSS transactions and for optimizing the use of the spectrum asset like a radio spectrum resource across a geographical area on the basis of parameters such as PSH offerings, ASH requirements and requests, MMD capabilities and requests, CP offerings and requirements, and application requirements.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like. In some embodiments, a wireless device may be or may include a peripheral device that is integrated with a computer, or a peripheral device that is attached to a computer. In some embodiments, the term "wireless device" may optionally include a wireless service.

As used herein, the term "network" is used in its broadest sense to mean any system capable of passing communications from one entity to another. Thus, for example, a network can be, but is not limited to, a wide area network, a WiFi network, a cellular network, and/or any combination thereof.

Figure 1:
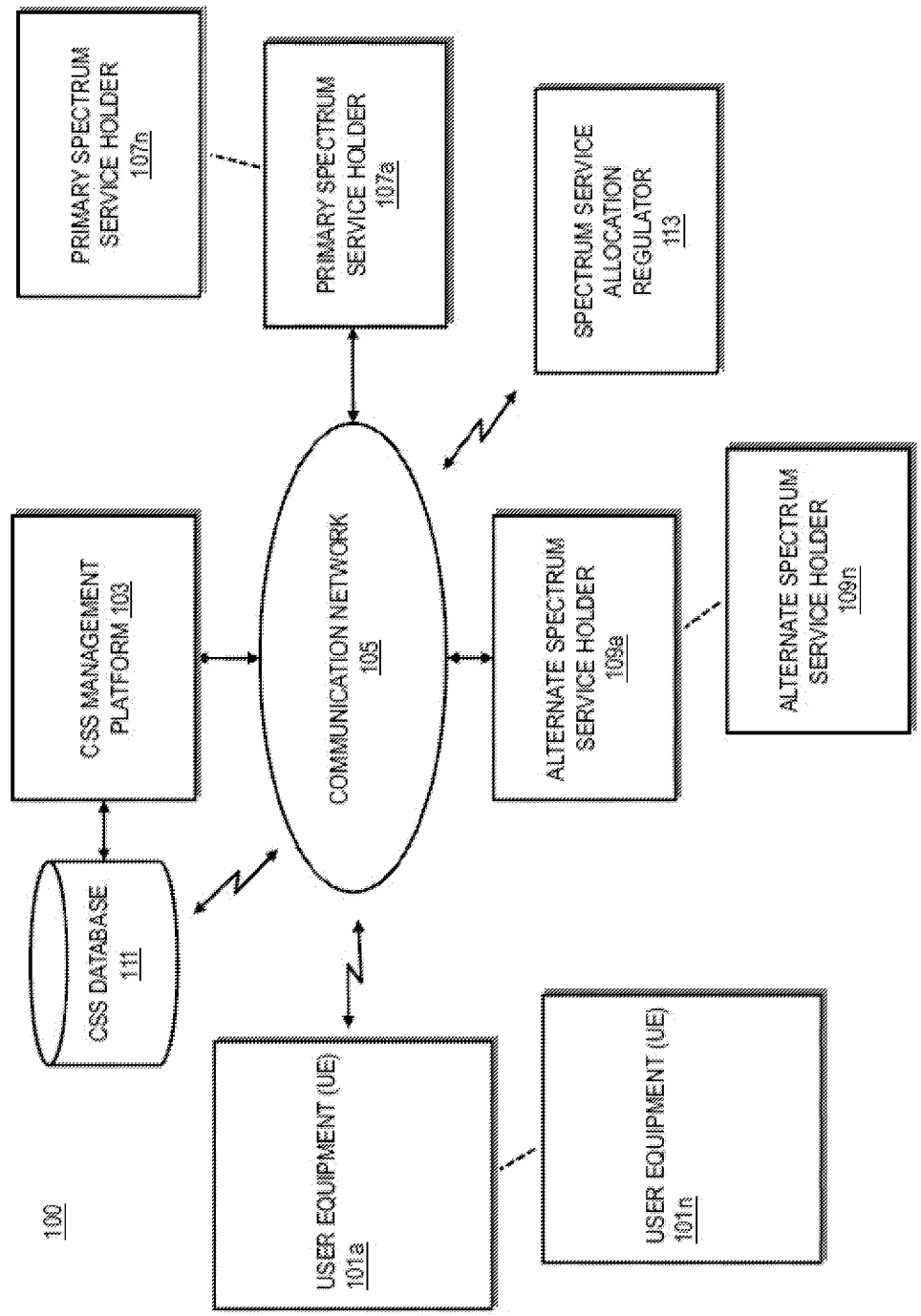
FIG. 1 is a diagram of a system capable of managing dynamic sharing of available spectrum services, according to one embodiment.

FIG. 1 is a diagram of a system 100 capable of managing dynamic sharing of available spectrum services, according to one embodiment. System 100 is capable of managing dynamic sharing of available spectrum services. For instance, the system 100 addresses the need for interfaces and protocols that enable communications among entities such as primary spectrum holders, alternate spectrum holders, spectrum brokers or management services, and/or regulatory agencies to facilitate dynamic sharing of available spectrum services by way of a cloud interface.

There are four major stakeholders in CSS: 1) a primary spectrum service holder having an exclusive right to use a specific spectrum service, 2) an alternate spectrum holder, e.g. a cellular or mobile broadband operator or service provider that may need to rent or borrow pieces of the spectrum owned or assigned to the primary spectrum service holder, 3) a regulatory agency that manages spectrum allocation and/or authorizes a renting or sharing deal between the primary spectrum service holder and the alternate spectrum service holder, and 4) a spectrum broker or management service that manages CSS transactions performed in the CSS cloud.

As shown in FIG. 1, the system 100 comprises user equipment (UE) 101a-101n (collectively referred to as UE 101) having connectivity to a CSS management platform 103, one or more primary spectrum service holders 107a-107n (collectively referred to as primary spectrum service holder 107), one or more alternate spectrum service holders 109a-109n (collectively referred to as alternate spectrum service holder 109), a CSS database 111, and one or more a spectrum service allocation regulators (collectively referred to and illustrated as spectrum service allocation regulator 113) via a communication network 105. While all of the UE 101, CSS management platform 103, primary spectrum service holder 107, alternate spectrum service holder 109, CSS database 111 and spectrum service regulator 113 are all illustrated as having connectivity to the communication network 105, each of these features may or may not have direct connectivity to one another, according to various embodiments and system architectures.

According to various embodiments, the CSS management platform 103 may be operated by a spectrum broker or management service and be operatively connected to, or include, the CSS database 111 like shown in FIG. 3. The CSS management platform 103 may also be configured to store various computational resources to perform CSS transactions in the CSS database 111 or in another memory associated with the CSS management platform 103.

According to various embodiments, the infrastructure of the alternate spectrum service holder 109 may be a radio access network (RAN) and/or a core network that has a capability to use various available spectrum services provided by the primary spectrum service holder 107 as rental spectrum, for example. Additionally, the UE 101 may be a CSS-capable multi-mode device (MMD), for example, capable of using various available spectrum services provided by the primary spectrum service holder 107.

In one or more embodiments, there may be any combination of one or more of the following four logical interfaces. For example, a first interface is defined between the primary spectrum service holder 107 and the CSS database 111. A second interface is defined between the alternate spectrum service holder 109 and the CSS management platform 103. A third interface is defined between the CSS management platform 103 and the CSS database 111. A fourth interface is defined between the primary spectrum service holder 107 and CSS management platform 103.

According to various embodiments, depending on CSS architecture, there may also, or alternatively, be other logical interfaces defined between the CSS management platform 103 and the UE 101, and/or the spectrum service allocation regulator 113. Or, the spectrum service allocation regulator may directly interface with the primary spectrum service holder 107.

In one or more embodiments, the primary spectrum service holder 107 provides the CSS management platform 103 and/or the CSS database 111 directly or by way of the CSS management platform 103 information, for instance, regarding which spectrum services such as radio resources are available for a particular period of time on a dynamic basis. The information regarding available spectrum services provided by the primary spectrum service holder 107 is accordingly stored in the CSS database 111.

According to various embodiments, the alternate spectrum service holder 109 or the UE 101 provides the CSS management platform 103 via an interface with one or more spectrum sharing requests regarding spectrum renting. For example, if the alternate spectrum service holder 109 or the UE 101 determines that additional spectrum services are needed beyond those currently available to the alternate spectrum service holder 109 or the UE 101 or estimated as being available in the future to the alternate spectrum service holder 109 or the UE 101, the alternate spectrum service holder 109 or the UE 101 makes a request for spectrum sharing that is sent to the CSS management platform 103 so that a need for current or future spectrum services may be satisfied.

For example, the request for spectrum sharing may specify various service criteria or details regarding the request such as, but not limited to, one or more of a period of time during which the requested spectrum sharing is to occur, a price offering range for the requested spectrum sharing, a frequency range within which the requested spectrum sharing is allowed to occur, a performance requirement associated with the source of the request for spectrum sharing, and a spectrum service holder with which the requested spectrum sharing is allowed to occur.

The primary spectrum service holder 107, along with the information regarding which spectrum services are available, may indicate various spectrum sharing criteria to CSS management platform 103 regarding renting conditions including, but not limited to, an asking price for sharing an available spectrum service, a performance data of the available spectrum service, a frequency range of the available spectrum service, and a spectrum sharing requestor with which the available spectrum service is allowed to be shared.

Based on a receipt of a request for spectrum service sharing, the CSS management platform 103 obtains information stored in the CSS database 111, and analyzes the alternate spectrum service holder 109's or the UE 101's requests for spectrum sharing, and may also consider any regulatory rules that are provided by the spectrum service allocation regulator 113 to cause an allocation of one or more available spectrum services to the alternate spectrum service holder 109 or the UE 101.

For example, the CSS management platform 103 may compare the various spectrum sharing criteria set by the primary spectrum service holder 107 with the service criteria provided by the alternate spectrum service holder 109 or the UE 101. Based on this comparison, the CSS management platform 103 may determine whether a particular available spectrum service should be shared with the requesting alternate spectrum service holder 109 or the UE 101. The determination to share the available spectrum service may be based, for example, on a matching between the spectrum sharing criteria stored in the CSS database 111 and the service criteria provided by the alternate spectrum service holder 109 or the UE 101. The matching may be based on an optimization routine associated with pairing the various spectrum sharing criteria and the various service criteria, for example. Then, based on the matching, a decision to share an available spectrum service stored in the CSS database 111 may be made and the available spectrum service may be allocated to the alternate spectrum service holder 109 or the UE 101.

For example, if a primary spectrum service holder 107 only wants to enable sharing/renting of its available spectrum services to certain competitor carriers at particular times, the CSS management platform 103 causes a decision to share available spectrum services to be made in accordance with that particular combination of spectrum sharing criteria. Or, for example, if a primary spectrum service holder 107 will only rent or share its available spectrum services for a particular minimum price, the CSS management platform 103 will only match an alternate spectrum service holder 109 or UE 101 that has a price offering that meets the asking price provided in the spectrum sharing criteria. According to various embodiments, the CSS management platform 103 may be configured to maximize the revenue produced by sharing available spectrum services. For example, if an alternate spectrum service holder 109 or a UE 101 provides service criteria including a price offering or a price range that exceeds the asking price for spectrum rental, the CSS management platform 103 will allocate the available spectrum services to the highest bidder (assuming multiple bidding alternate spectrum service holders 109 or UE 101's, for example) and/or, if there is only one bidding entity, will allocate the available spectrum service at the maximum of the offered range, rather than at the asking price which may be lower than the offered range.

In one or more embodiments, the various spectrum sharing criteria and/or the service criteria may be weighted such that certain criteria is more important than other criteria, so that the decision to share spectrum services may be based on a weighted matching. For instance, if a spectrum sharing criteria is set to be limited to a particular time has a weighting of "X", but a price point for spectrum sharing is set as "Y" which is more heavily weighted than X, and a particular price point offered by the alternate spectrum service holder 109 or the UE 101 causes the timing limit to be overridden, the CSS management platform 103 may cause a decision to share the available spectrum service based on the price offering even though the primary spectrum service holder 107 would normally not allow spectrum sharing during the time at which the request for sharing spectrum services is made or the time at which the spectrum sharing is to occur. In other words, if a primary spectrum service holder 107 does not want to share spectrum services with a competitor such as alternate spectrum service holder 109 or UE 101 during peak hours, the primary spectrum service holder 107 may do so if the price is right.

It should be noted that the above examples are merely exemplary regarding potential matching, alignment, weighting, optimization and/or reasoning for comparing and matching an alternate spectrum service holder 109 or UE 101 with an available spectrum service provided by primary spectrum service holder 107. Any type of data or criteria, combination, or weighting scheme for spectrum sharing and/or service criteria may be provided to the CSS management platform 103 for consideration when making a determination to share available spectrum services and when allocating available spectrum services to an alternate spectrum service holder 107 and/or a UE 101.

Additionally, the CSS management platform 103 may consider any regulatory rules provided by the spectrum service allocation regulator 113, or rules could be integrated into CSS database 111, when determining to share the available spectrum service with the requesting alternate spectrum service holder 109 or the UE 101. For example, any regulatory rules that govern allocation of spectrum services by way of rental, borrowing, sharing, etc. may be considered when the CSS management platform 103 optimizes the matching of spectrum sharing criteria and service criteria, or the CSS management platform 103 may apply the regulatory rules after a determination to share the available spectrum services is made and the regulatory rules are applied to approve or disapprove of the decision to share the available spectrum services and/or the allocation of the available spectrum services to the alternate spectrum service holder 109 or the UE 101.

In one or more embodiments, the CSS management platform 103 updates the CSS database 111 regarding the allocation of the available spectrum services to the alternate spectrum service holder 109 or the UE 101. The CSS management platform 103 may also advise the alternate spectrum service holder 109 or the UE 101 of a decision on their request for spectrum sharing by way of a notification message. The notification message may include specific details regarding the decision to share the available spectrum service and/or the allocation such as price paid, price to be paid, time for the allocation, frequency allocation, primary spectrum service holder details, etc.

The CSS management platform 103 may also report the allocation of the available spectrum service to the primary spectrum service holder 107 by way of a notification message. The notification message may include specific details regarding the decision to share the spectrum service and/or the allocation such as price paid, price to be paid, time for the allocation, frequency allocation, primary spectrum service holder details, etc.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, CSS management platform 103, primary spectrum service holder 107, alternate spectrum service holder 109, and optionally CSS database 111 and spectrum service allocation regulator 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
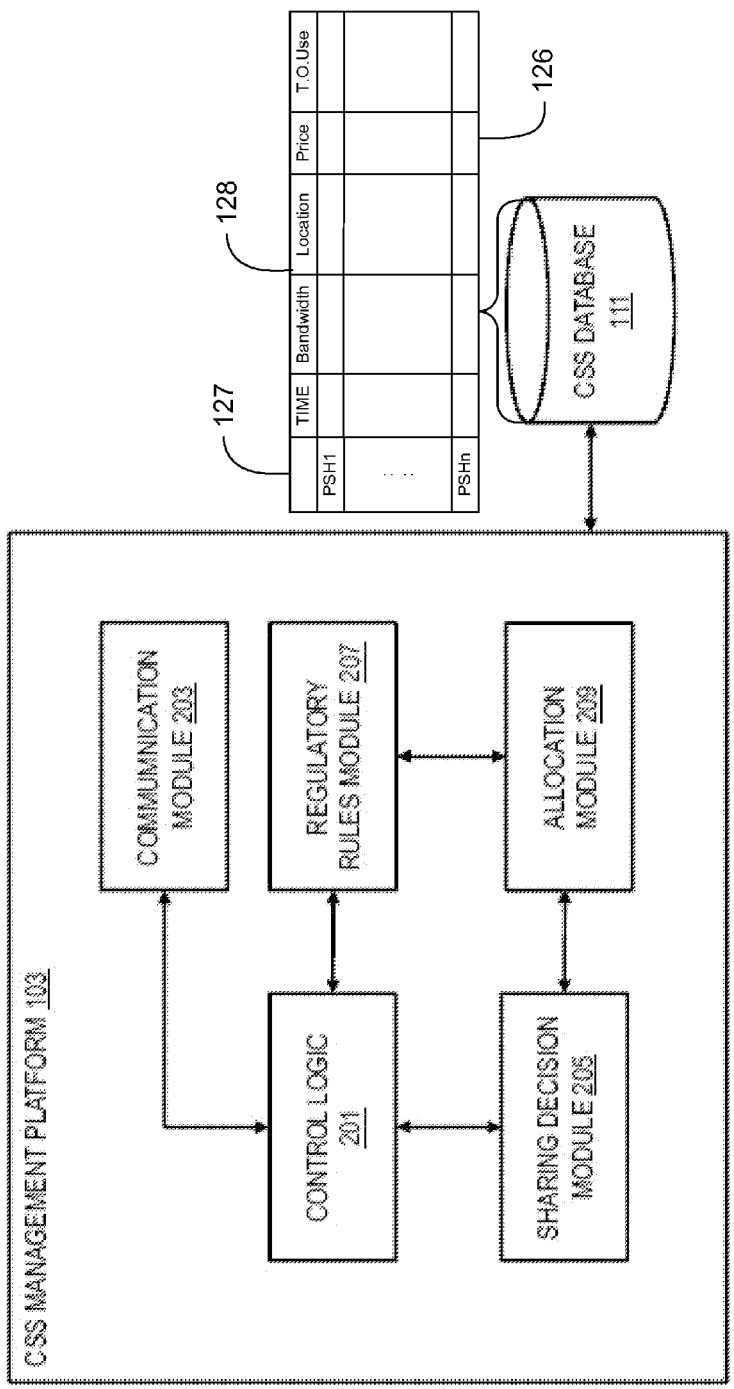
FIG. 2 is a diagram of the components of a cloud spectrum services management platform, according to one embodiment.

FIG. 2 is a diagram of the components of a cloud spectrum services management platform 103, according to one embodiment. FIG. 2 is a diagram of the components of CSS management platform 103, according to one embodiment. By way of example, the CSS management platform 103 includes one or more components for managing a dynamic sharing of available spectrum services. It is contemplated that the functions of these components may be combined in one or more components or performed by other components of equivalent functionality. In this embodiment, the CSS management platform 103 includes a communication module 201, a control logic 203, a sharing decision module 205, a regulatory rules module 207, an allocation module 209, and optionally the CSS database 111, discussed above.

According to various embodiments, the CSS management platform 103 receives information regarding one or more available spectrum services provided by the primary spectrum service holder 107 by way of the communication module 201. The control logic 203 causes the information regarding the one or more available spectrum services to be stored in the CSS database 111. A request for spectrum sharing may be received by the communication module 201. Upon receipt of the request for spectrum sharing, the control logic 203 instructs the sharing decision module 205 to assess any information associated with the request for spectrum sharing such as service criteria discussed above and/or the source of the request for spectrum sharing such as alternate spectrum service holder 109 or UE 101. The sharing decision module 205 accordingly compares the information associated with the request for spectrum sharing with any information associated with the available spectrum services stored in the CSS database 111 such as, but not limited to, any spectrum sharing criteria and/or any regulatory rules managed by the regulatory rules module 207 to determine to share one or more of the available spectrum services with the source of the request for spectrum sharing.

As discussed above, the decision to share spectrum services may be made inclusive of any available regulatory rules or be made before any regulatory rules are applied to verify a decision to share the available spectrum services. Upon making a decision to share one or more available spectrum services, the control logic 203 causes the allocation module 209 to facilitate sharing of the available spectrum services by allocating one or more available spectrum services to the source of the request for spectrum sharing, i.e. the alternate spectrum service holder 107 or the UE 101.

Upon allocating the available spectrum services to the source of the request for spectrum sharing, the allocation module 209 notifies one or more of the primary spectrum service holder 107 and the alternate spectrum service holder 109 or the UE 101 that the allocation has occurred and may also indicate various details related to the decision to share the one or more available spectrum services such as price, time, provider, etc. by way of the communication module 201. Additionally, the allocation module 209 causes the CSS database 111 to be updated to reflect the allocated spectrum services. CSS database 111 receives dynamic spectrum availability information from the PSH identifying the primary holder and spectrum asset descriptors such as time, bandwidth, terms of use, price, and location. The availability information may be formatted to any suitable database structure and may be stored by a memory. A tabular form of the spectrum availability information is shown as table 126. The table 126 lists the primary spectrum holder 127 and the spectrum asset descriptors 128.

FIG. 3 provides an overview 300 of the concept behind Cloud Spectrum Services (CSS) with behavior pattern prediction for dynamic spectrum rentals in accordance to an embodiment. The overview shows the interaction between a user 310, a broker 135 and a database 111, collectively CSS management platform 103, a primary spectrum holder 107, and an optional payment system 390. In the illustrated scenario a primary spectrum holder 107 may have available spectrum that it may wish to advertise for rent. The PSH can upload this information as shown by data flow 320 directly to database 111 or to broker 135 as shown by data flow 325. As noted earlier the functions of the broker 135 and the database can be combined into a single entity such as CSS management platform 103. In this way the database 111 is populated by PSHs advertising their spectrum for rent. Information provided by a PSH can include time, bandwidth, location, and term of use.

Spectrum users are often interested in obtaining access to spectrum for a particular application, such as enterprise applications, two-way communications, point-to-point microwave transmissions, point-to-multipoint communications, cellular communications, mobile broadband communications, and so forth. It will be appreciated that this list is in no way exhaustive of the possible communication applications of potential users. A user 310 requesting spectrum 330 for rent would communicate with the broker and provides the broker with at least one time, bandwidth, location, and term of use. Additionally, through specialized messaging the broker is capable of initiating or placing advertised spectrum with a subset of users. In some instances, the user need not specify the amount of bandwidth that the user is seeking, but this information can be specified if known to the user. The broker 135 takes the request of user 310 and formulates a query 340 that is sent to the database for processing. It is noted that query 340 can also be formulated by the broker 135 to forecast or predict future spectrum needs. At the database 111 or at the CSS management platform 103 an artificial intelligence 345 module applying machine learning techniques user behavior pattern or request for additional spectrum. Once the user's needs are interpreted and the availability spectrum for rent is interpreted, the database may apply algorithms to find a match between the user's spectrum need and the spectrum that is available or may be available from a primary spectrum holder 107. The result of the query which identifies the closest match to the request for spectrum is communicated back to the broker 135 as shown by data flow 550 and then to user 310 as shown by data flow 560. Instances where the broker request a forecast for future spectrum needs, the broker engages in negotiation, data flow 365, with certain holders to meet the anticipated need for spectrum. If the spectrum suggested by the broker is acceptable to the user, the user invokes a compensation system 390 that may include a transaction database and may match advertised spectrum to payments to satisfy any monetary or non-monetary consideration that is owed based on the placement of a spectrum asset. The payment system may receive compensation information from the broker 135 or from another source, such as the spectrum user 310 or a third party.

FIG. 4 is a block diagram of an apparatus to predict requests for spectrum and user behavior pattern in accordance to an embodiment. The block diagram shows the apparatus from of artificial intelligence module 345. The CSB analytics engine 440 receives various inputs like input parameters 410 and learned behavior pattern 435 to its optimization procedure. The proposed scheme uses a learning engine 420 that stores information pertaining to the request like time of the day, location, duration of request, prior decisions made by an analytics engine, application type and the like to generate user behavior patterns that are stored in the knowledge base 430. This information is also used as an input to the analytics engine 440 to optimize allocation. The learning engine 420 uses various cognitive learning algorithms like Markov models, genetic algorithm, neural network, cluster analysis, fuzzy logic, regression analysis, or a combination thereof or other algorithms. Using such predictive behavior leads to better spectrum allocations and higher utilization. For instance, if the CSB knows it will be getting request for additional 20 MHz of spectrum in the next one hour but does have enough to support all the request, it could proactively convey this message to the spectrum holders 107 and negotiate additional spectrum. Alternately, while making allocations, it will not allocate spectrum that will likely be requested by device if that is the optimal allocation. Using predictive algorithms will also reduce the amount of thrashing of the spectrum and less re-assignments. Example of input parameters 410 can include user requests, MMD mobility model, MMD profile, prior decisions made by an analytics engine, application characteristics, visible networks, geographical database or location entries, outstanding requests, spectrum availability. The CSB analytics engine 440 formulates a spectrum allocation 445 comprising spectrum allocation or MMD Profile.

FIG. 5 is a flowchart of a method to generate user behavior patterns that are stored in the knowledge base and used by an analytic engine to optimize spectrum allocation in accordance to an embodiment. Method 500 begins with action 510 by receiving input parameters such as user requests, MMD mobility model, MMD profile, application characteristics, visible networks, geographical database or location entries, outstanding requests, spectrum availability, or prior decisions made by an analytics engine. Control is then passed to action 520 where the input parameters are subjected to artificial intelligence or machine learning processing. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set. Such methodologies can be retained in a storage device or database 111. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models such as game trees, game matrices, pure and mixed strategies, utility algorithms, any of the aforementioned algorithms and methodologies can be employed in the implementation of various automated aspects described herein. Action 520 identifies the behavior pattern and/or the future need for spectrum from the input parameters. Control is then passed to action 530 where the pattern identified in action 520 is forwarded to the knowledge base 430 and the analytics engine 440.

FIG. 6 is a flowchart of a method to implement predictive behavior determined in FIG. 5 to accomplish better spectrum allocation and higher utilization in accordance to an embodiment. Method 600 begins with action 610 by receiving input parameters such as user requests, MMD mobility model, MMD profile, application characteristics, visible networks, geographical database or location entries, outstanding requests, spectrum availability, or prior decisions made by an analytics engine. Additional inputs are received such as knowledge base input 620 and learning engine input 630. The learning engine input 630 could be appended to knowledge base input 620. These inputs are illustrated separately to emphasize that the past processed inputs like knowledge base input 620 and present processed inputs learning engine input 630 are considered by the analytics engine process 640. Analytics engine 640 uses a rule set to perform a comparing, identifying and highlighting functions. The rule set preferably comprises rules that are to be processed in a preselected order. The rules preferably use an "IF . . . THEN" syntax, in which: the "IF" portion of each rule comprises a comparison between a field and a reference value field for a particular user such an MMD; and the "THEN" portion of each rule passes an evaluation of the argument as determined in the "IF" portion. For example, "IF" a request for future spectrum is expected "THEN" negotiate for spectrum with a PSH. In yet another example, "IF" a user is requesting spectrum "THEN" the request is analyzed to ascertain its effect on the optimization of the network. The analytics engine 640 while making allocations will not allocate spectrum that will likely be requested by device if that is the optimal allocation. Using predictive algorithms the analytics engine 640 will also reduce the amount of thrashing of the spectrum and less re-assignments.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of an automated spectrum trading and the optimization of spectrum allocation have been described. Using the disclosed approach, efficient and productive use of spectrum may be made, while minimizing the procedural and transactional burdens on spectrum holders or spectrum users. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A dynamic cloud based spectrum management platform, comprising:
   a database operable to store information associated with at least one spectrum asset, wherein the stored information includes dynamic spectrum availability from spectrum holders advertising their spectrum for rent, wherein the database is further operable to apportion the spectrum for rent in response to knowledge information about a user request and a past behavior pattern of the user;
   wherein if a request for future spectrum is expected from the user then the database will negotiate with the primary spectrum holders for the future spectrum;
   wherein the knowledge information is a result of a learning engine;
   wherein the learning engine is selected from a group consisting of markov model, genetic algorithm, neural network, cluster analysis, regression analysis, fuzzy logic, or a combination thereof.

2. The dynamic cloud based spectrum management platform in accordance to claim 1, wherein the user is one or more content provider, client device, operator of a fixed network, base station, cluster of client devices, or a combination thereof.

3. The dynamic cloud based spectrum management platform in accordance to claim 2, wherein the user request comprises at least on of time of the day, location, duration of request, application type, user defined request, or a combination thereof.

4. The dynamic cloud based spectrum management platform in accordance to claim 3, wherein apportion the spectrum comprises denying a user request for spectrum to achieve optimal allocation of spectrum.

5. The dynamic cloud based spectrum management platform in accordance to claim 3, wherein apportion the spectrum comprises predicting spectrum need for a user and conveying a message to the spectrum holder to negotiate for the predicted spectrum need for the user.

6. A non-transitory machine-accessible medium that provides instructions, which when accessed, cause a machine to perform operations comprising:
   maintaining a database operable to store information associated with at least one spectrum asset, wherein the stored information includes dynamic spectrum availability from spectrum holders advertising their spectrum for rent;
   apportioning the spectrum for rent in response to knowledge information about a user request and a past behavior pattern of the user;
   wherein if a request for future spectrum is expected from the user then the database will negotiate with the primary spectrum holders for the future spectrum;
   wherein the knowledge information is a result of a learning engine;
   wherein the learning engine is selected from a group consisting of markov model, genetic algorithm, neural network, cluster analysis, regression analysis, fuzzy logic, or a combination thereof.

7. The non-transitory machine-accessible medium in accordance to claim 6, wherein the user is one or more content provider, client device, operator of a fixed network, base station, cluster of client devices, or a combination thereof.

8. The non-transitory machine-accessible medium in accordance to claim 7, wherein the user request comprises at least on of time of the day, location, duration of request, application type, user defined request, or a combination thereof.

9. The non-transitory machine-accessible medium in accordance to claim 8, wherein apportion the spectrum comprises predicting spectrum need for a user and conveying a message to the spectrum holder to negotiate for the predicted spectrum need for the user and optionally denying a user request for spectrum to achieve optimal allocation of spectrum.

10. An apparatus comprising:
at least one processor; and
at least one memory including computer program code for one or more programs,
the at least one memory and the computer program code configured to, with the at least one processor, cause the apparatus to perform at least the following,
cause, at least in part, information corresponding to one or more available spectrum services provided by one or more spectrum service holders to be stored in a cloud spectrum service database, the information comprising one or more spectrum sharing criteria respectively associated with the one or more available spectrum services, the one or more spectrum sharing criteria being provided by the one or more spectrum service holders;
process a request from a user for spectrum sharing to cause, at least in part, a determination to share one or more of the one or more available spectrum services with a source of the request for spectrum sharing based, at least in part, on a matching of the one or more spectrum sharing criteria stored in the cloud spectrum service database and one or more service criteria associated with the source of the request for spectrum sharing; and
cause, at least in part, one or more of the one or more available spectrum services to be allocated to the source of the request for spectrum sharing based, at least in part, on knowledge information about a user request and a past behavior pattern of the user;
wherein if a request for future spectrum is expected from the user then the database will negotiate with primary spectrum holder for the future spectrum;
wherein the knowledge information is a result of a learning engine;
wherein the learning engine is selected from a group consisting of markov model, genetic algorithm, neural network, cluster analysis, regression analysis, fuzzy logic, or a combination thereof.

11. The apparatus in accordance to claim 10, wherein the user is one or more content provider, client device, operator of a fixed network, base station, cluster of client devices, or a combination thereof.

12. The apparatus in accordance to claim 11, wherein the user request comprises at least on of time of the day, location, duration of request, application type, user defined request, or a combination thereof.

13. The apparatus in accordance to claim 12, wherein apportion the spectrum comprises denying a user request for spectrum to achieve optimal allocation of spectrum.

14. The apparatus in accordance to claim 12, wherein apportion the spectrum comprises predicting spectrum need for a user and conveying a message to the spectrum holder to negotiate for the predicted spectrum need for the user.

* * * * *